United States Patent
Gupta et al.

(10) Patent No.: US 9,535,746 B2
(45) Date of Patent: Jan. 3, 2017

(54) HONORING HARDWARE ENTITLEMENT OF A HARDWARE THREAD

(71) Applicant: International Business Machines Corporation, Armonk, NY (US)

(72) Inventors: Nitin Gupta, Bangalore (IN); Mehulkumar J. Patel, Bangalore (IN); Deepak C. Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 14/134,476

(22) Filed: Dec. 19, 2013

(65) Prior Publication Data

US 2015/0178088 A1 Jun. 25, 2015

(51) Int. Cl.
G06F 9/30 (2006.01)
G06F 9/50 (2006.01)
G06F 9/48 (2006.01)
G06F 9/455 (2006.01)

(52) U.S. Cl.
CPC ......... *G06F 9/4881* (2013.01); *G06F 9/30101* (2013.01); *G06F 9/5077* (2013.01); *G06F 9/45558* (2013.01); *G06F 9/505* (2013.01); *G06F 9/5027* (2013.01); *G06F 9/5061* (2013.01); *G06F 2009/4557* (2013.01)

(58) Field of Classification Search
CPC .. G06F 9/4881; G06F 9/5077; G06F 9/30101; G06F 9/5061; G06F 9/5027; G06F 9/505; G06F 9/45558; G06F 2009/4557
See application file for complete search history.

(56) References Cited

U.S. PATENT DOCUMENTS

| | | | |
|---|---|---|---|
| 7,870,551 | B2 | 1/2011 | Anand et al. |
| 8,024,728 | B2 | 9/2011 | Anand et al. |
| 8,108,866 | B2 | 1/2012 | Anand et al. |
| 8,219,995 | B2 | 7/2012 | Flemming et al. |
| 8,285,973 | B2 | 10/2012 | El-essawy et al. |

(Continued)

FOREIGN PATENT DOCUMENTS

| | | |
|---|---|---|
| CN | 104731572 A | 6/2015 |
| EP | 1616259 B1 | 6/2007 |

OTHER PUBLICATIONS

Hauck, et al., "Evaluating and Modeling Virtualization Performance Overhead for Cloud Environments", <http://sdgweb.ipd.kit.edu/publications/descartes-pdfs/HuQuHaKo2011-CLOSER-ModelVirtOverhead.pdf>.

(Continued)

*Primary Examiner* — Daniel Pan
(74) *Attorney, Agent, or Firm* — Lance I. Hochhauser; Stephen R. Yoder

(57) ABSTRACT

A method for scheduling the execution of a computer instruction, receive an entitlement processor resource percentage for a logical partition on a computer system. The logical partition is associated with a hardware thread of a processor of the computer system. The entitlement processor resource percentage for the logical partition is stored in a register of the hardware thread associated with the logical partition. An instruction is received from the logical partition of the computer system and the processor dispatches the instruction based on the entitlement processor resource percentage stored in the register of the hardware thread associated with the logical partition.

8 Claims, 5 Drawing Sheets

(56) References Cited

U.S. PATENT DOCUMENTS

| | | | |
|---|---|---|---|
| 2006/0161766 A1* | 7/2006 | Attinella | G06F 11/3409 |
| | | | 713/100 |
| 2008/0172672 A1* | 7/2008 | Logan | G06F 9/45533 |
| | | | 718/104 |
| 2010/0333087 A1 | 12/2010 | Vaidyanathan et al. | |
| 2012/0204172 A1 | 8/2012 | Hilton | |
| 2015/0178131 A1* | 6/2015 | Gupta | G06F 9/30101 |
| | | | 718/102 |

OTHER PUBLICATIONS

Mrinmoyee, et al., "PowerVM, The Server Virtualization Without Limits", International Journal of Management & Information Technology, vol. 3, No. 2, Jan. 2013, pp. 38-42, <http://cirworld.ijssronline.com/index.php/ijmit/article/view/32MIT875>.

* cited by examiner

HONORING HARDWARE ENTITLEMENT OF A HARDWARE THREAD

FIELD OF THE INVENTION

The present invention relates generally to the field of computer virtualization, and more particularly to hardware thread entitlement.

BACKGROUND OF THE INVENTION

System virtualization creates multiple virtual systems from a single physical system. The physical system can be a stand-alone computer, or alternatively, a computing system utilizing clustered computers and components. Virtual systems are independent operating environments that use virtual resources made up of logical divisions of physical resources such as processors, memory and input/output (I/O) adapters. System virtualization is typically implemented through hypervisor technology. Hypervisors, also called virtual machine managers, use a thin layer of code in software or firmware to achieve fine-grained, dynamic resource sharing.

The hypervisor provides the ability to divide physical system resources into isolated logical partitions (also referred to as LPARs). Each LPAR operates like an independent system running its own operating environment (i.e., a virtual system). The hypervisor can allocate dedicated processors, I/O adapters, and memory to each LPAR. The hypervisor can also allocate shared processors to each LPAR. More specifically, the hypervisor creates virtual processors from physical processors, so that LPARs can share the physical processors while running independent operating environments.

Although each LPAR acts as an independent server, the LPARs on a physical server can share resources with each other. The hypervisor's ability to share resources among many LPARs allows increased resource utilization by shifting the server resources to where they are needed.

A processor is a device that executes programmable instructions. A processor core consists of components for execution of programmable instructions: floating point unit, fixed point unit, branch unit, load/store unit, internal caches, associated pipeline, General Purpose Registers (GPRs), Special Purpose Registers (SPRs) and Floating Point Registers (FPRs). In modern day superscalar processors, to increase the utilization of execution units, and hence throughput of work done by processor, the execution units are shared among multiple hardware threads in a time-shared manner, such that to the executing software it appears as if the processor is dedicated to itself. To achieve that, certain essential processor resources like GPRs, FPRs, SPRs are duplicated to create a notion of "hardware thread", sometimes referred to as a "Central Processing Unit (CPU) thread." In a sense, an LPAR consists of multiple software processes, in which a software process consists of multiple software threads, in which each software thread can execute on a hardware thread.

The more processors assigned to an LPAR, the greater the number of concurrent operations the LPAR can run at any given time. Dedicated processors are physical processors that are assigned to a single partition. Conversely, shared processors are physical processors whose processing capacity is shared among multiple LPARs.

Simultaneous multithreading is the ability of a single physical processor to simultaneously dispatch instructions from more than one hardware thread. Because there are two or more hardware threads per physical processor, additional instructions can run at the same time.

Context switching is this process of swapping one program out of the Central Processing Unit (CPU) and replacing it with another process's instructions. Context switching is how the computer's operating system multitasks different programs. Using context switching, one program executes for a while and then saves a copy of the program's execution state (such as register values), restores the execution state of the next program to execute on the processor. A context switch can be referred to as a "register context switch," or a "frame switch," or a "thread context switch."

SUMMARY

Aspects of an embodiment of the present invention disclose a method, computer program product, and computing system, to schedule the execution of a computer instruction. The method includes receiving an entitlement processor resource percentage for a logical partition on a computer system. The method further includes associating the logical partition with a hardware thread of a processor of the computer system. The method further includes storing the entitlement processor resource percentage for the logical partition in a register of the hardware thread associated with the logical partition. The method further includes receiving an instruction from the logical partition of the computer system and the processor dispatching the instruction based on the entitlement processor resource percentage stored in the register of the hardware thread associated with the logical partition.

DETAILED DESCRIPTION

Figure 1:
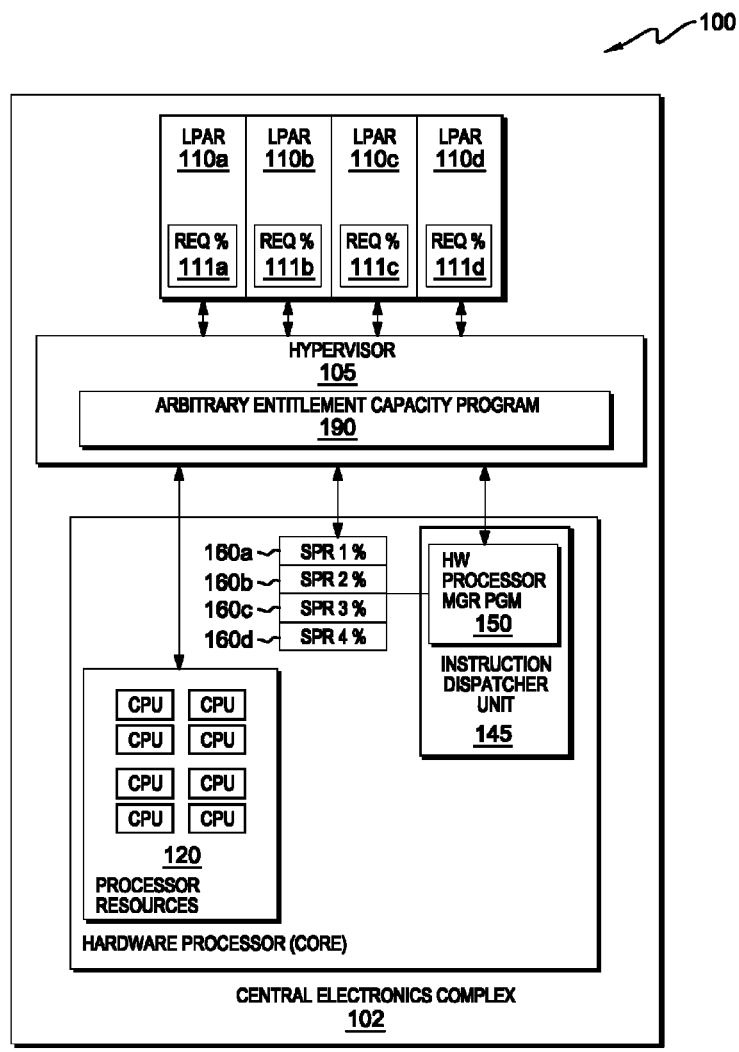
FIG. 1 is a diagram of a computer infrastructure, in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. The following Figures provide an illustration of one embodiment. The embodiment, taken in part or in whole, does not imply any limitations with regard to the environments in which different embodiments may be implemented.

FIG. 1 is a diagram of computer infrastructure 100, in accordance with one embodiment of the present invention. Computer infrastructure 100 includes: central electronics complex (CEC) 102, hypervisor 105, LPARs 110a through LPAR 110d, requirement percentage (REQ) % 111a through REQ % 111d, processor resources 120, hardware processor manager program 150, entitlement special purpose register (ESPR)1% 160a, ESPR2% 160b, ESPR3% 160c, ESPR4% 160d, and arbitrary entitlement capacity program 190. Entitlement SPR is sometimes referred to simply as "SPR."

CEC 102 is a computer providing an environment for executing LPARs. In various embodiments, CEC 102 may include additional devices or components, such as disk drives, networking adapters, etc., which are not depicted for simplicity. Other embodiments may refer to CEC 102 as a "processor box," a "mainframe box," and hardware processors components as a "core," In other embodiments, CEC 102 may be connected to other CECs via a storage area network fabric, as someone skilled in the arts would recognize.

Hypervisors provides the ability to divide physical system resources, processors, memory, and I/O, and allocate the resources to isolated LPARs. In one embodiment, hypervisor 105 can allocate dedicated processor resources, dedicated I/O resources, and dedicated memory resources to each LPAR, referred to as "dedicated resources." In another embodiment, hypervisor 105 can allocate some resources to be dedicated and some resources to be shared, a "hybrid" allocation. In the depicted embodiment, hypervisor 105 allocates shared processor resources, shared I/O resources, and shared memory resources to each LPAR, referred to as "shared resources." In the depicted embodiment, the shared resources are also referred to as "virtual", such as "virtual processors."

Strategies of sharing 100% of resources include, but are not limited to time-sharing processor resources among multiple LPARs, which are managed by hypervisor software according the LPAR's entitlement requirements; and/or hypervisor 105 stores a value in a special purpose register, entitlement SPR, associated with a hardware thread and associated with LPAR's entitlement requirement. Furthermore, processor's instruction dispatcher unit 145 will honor the entitlement SPR's value and consequently dispatches instructions from hardware threads in accordance of entitlement SPR's value. This way the LPAR's entitlement requirement is managed entirely in the processor hardware and hence does not require the hypervisor to preempt. In the depicted embodiment, the latter strategy is implemented. For instance, if an LPAR entitlement SPR is 50%, the processor will attempt to provide the LPAR execution time equal to 50%. All resources necessary to execute the LPAR are dedicated to the LPAR during execution of that LPAR.

In the depicted embodiment, hypervisor 105 links an LPAR's REQ % with an entitlement SPR. Hypervisor 105 loads the entitlement SPR with the linked REQ % value. Consequently, linking a REQ % to an entitlement SPR dedicates the LPAR to the specific entitlement SPR. There is a one-to-one correspondence between LPARs/REQ % and entitlement SPRs. No other LPAR will use the linked entitlement SPR, thus there is no time-sharing of entitlement SPRs among LPARs. For instance, if REQ % 111a is 25%, hypervisor 105 will link LPAR 110a to an available entitlement SPR, such as ESPR1% 160a, and set ESPR1% 160a to 25%. In the depicted embodiment, LPAR 110a can be linked to ESPR1% 160a for the entire lifecycle of LPAR 110a. Although, in other embodiments, in the course of a LPAR lifecycle, hypervisor 105 may rearrange the links.

Hypervisor 105 communicates with a Hardware Management Console (HMC) computer via a network connection (not shown), which is part of the storage area network fabric mentioned previously. The HMC computer is operated by an administrator and issues commands to hypervisor 105 and receives information status from hypervisor 105, such as an LPAR's execution performance. Hypervisor 105 receives the LPAR's profile along with the associated REQ % from the HMC computer. Hypervisor 105 contains arbitrary entitlement capacity program 190.

Each LPAR, LPAR 110a to LPAR 110d, operates as an independent system running its own operating environment (i.e., a virtual system), such as a UNIX-like operating system, and possibly one or more applications. An application may be an application server; such server may provide information on airline flights. Hypervisor 105 is controlling the execution of LPAR 110a to LPAR 110d.

LPAR 110a to LPAR 110d contain REQ % 111a through REQ % 111d, respectively. REQ % 111a through REQ % 111d each holds an enumeration that represents the percentage of dispatches that the associated LPAR deems necessary to execute efficiently, deemed entitlement processor resource percentage. The REQ % is included in the LPAR profile. An LPAR profile is a list of LPAR attributes. For instance, an LPAR that provides public information on airline flights might only require five percent of resources, leaving 95% of resources available for other LPARs in the CEC. However, an LPAR that provides data-mining for proteins may require 50% of resources, as the application of LPAR would be computationally expensive. Furthermore, the need for an LPAR context switch is minimized, or possibly eliminated, as hypervisor 105 is utilizing processor hardware enablement of entitlement SPR to provide every LPAR a specified share of virtual resources as per given profile's REQ %.

In the depicted embodiment, REQ % 111a through REQ % 111d may be in the range of zero percent to one-hundred percent. The granularity is to the hundredth percentage place, for example 52.85%. In other embodiments, the range or granularity may be different. In other embodiments, the value may be symbols equated to enumerations. For instance, the symbols: A, B, C, D may correspond to percentages: 10%, 20%, 30%, and 40%. Furthermore, in other embodiments, REQ % 111a through REQ % 111d values can be stored within hypervisor 105 and simply associated with the appropriate LPAR. In still other embodiments, REQ % 111a through REQ % 111d may be stored outside the CEC, such as on a HMC computer, or other devices, not shown, as long as hypervisor 105 has access to REQ % 111a through REQ % 111d.

REQ % 111a through REQ % 111d may each be changed at any time during the lifecycle of the associated LPAR. The change may be made by using the HMC computer by an administrator or by software acting in proxy with the same privileges as an administrator executing on the network with accesses to the LPAR's profile. In the depicted embodiment, one the REQ % is established, hypervisor 105 has to recalculate available resources to understand if any modifications can be accommodated or not. In various embodiments, REQ % can be changed dynamically provided physical resources are available. There are many scheduling combinations, as someone skilled in the arts would recognize.

In the depicted embodiment, the HMC computer communicates with hypervisor 105. Using the HMC computer an administrator builds an LPAR profile which in-turn is used by hypervisor 105 to construct an LPAR with the proper attributes, including the proper REQ %.

Processor resources 120 communicates with hardware processor manager program 150. Processor resources 120 are the physical processing devices that execute a hardware thread, in the depicted embodiment each physical processing device is labeled as a central processing unit (CPU). Virtual processors are allocated from the pool of physical processing devices. In the depicted embodiment there are eight CPUs, however, in other embodiments the number of CPUs may be greater or less than eight.

Hardware processor manager program 150 is contained in the hardware processor. Hardware processor manager 150 program uses ESPR 1% 160a through ESPR 4% 160d in the execution of hardware threads. In one embodiment, steps of hardware processor manager program 150 are implemented in hardware logic in the processor's instruction dispatcher unit 145. Instruction dispatcher unit 145 dispatches instructions to the execution unit in accordance with the REQ % value contained in the entitlement SPRs. In the depicted embodiment, a hardware thread contains instructions only from one associated LPAR and is dedicated to an entitlement SPR. Hardware processor manager program 150 is further discussed in FIG. 2 and FIG. 5.

ESPR1% 160a, ESPR2% 160b, ESPR3% 160c, and ESPR4% 160d, each hold one REQ %. ESPR1% 160a, ESPR2% 160b, ESPR3% 160c, and ESPR4% 160d, storage is managed by hypervisor 105. Hardware processor manager program 150 uses the entitlement SPRs to determine the percentage of core capacity to allocate to an associated hardware thread. All entitlement SPRs will have sufficient storage capacity necessary to hold a REQ %. In the depicted embodiment there are four entitlement SPRs, however, in other embodiments there may be more or less entitlement SPRs. The number of entitlement SPRs will equal the number of hardware threads.

Arbitrary entitlement capacity program 190 is contained in hypervisor 105. Arbitrary entitlement capacity program 190 is the software that acquires and tracks available entitlement on each physical CPU. Arbitrary entitlement capacity program 190 assigns each REQ % to a hardware thread on available physical CPU and stores the REQ % value in the associated hardware thread's entitlement SPR.

Figure 2:
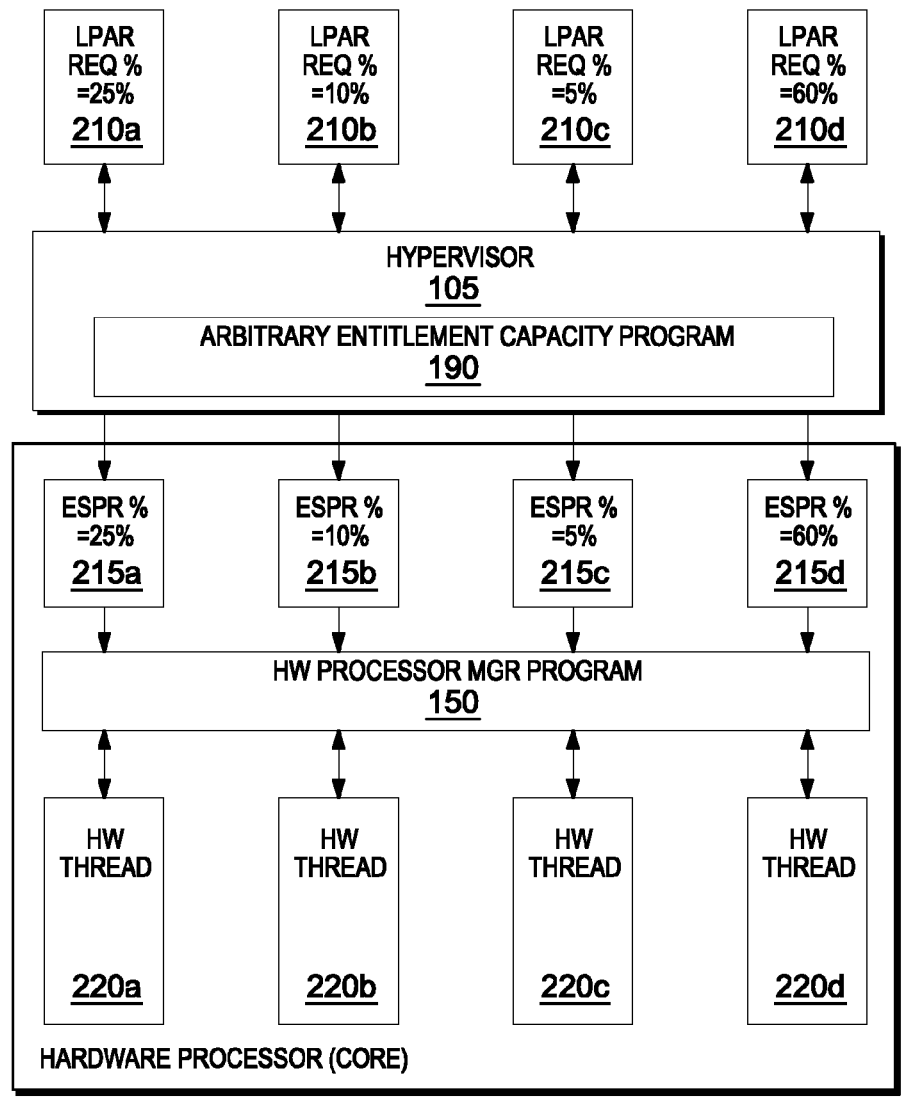
FIG. 2 depicts the relationship among LPARs, SPRs, and hardware threads.

FIG. 2 depicts the relationship among LPAR 210a, LPAR 210b, LPAR 210c, LPAR 210d, ESPR 215a, ESPR 215b, ESPR 215c, ESPR 215d, hardware thread 220a, hardware thread 220b, hardware thread 220c, and hardware thread 200d, in accordance with one embodiment of the present invention. FIG. 2 contains LPAR 210a through LPAR 210c, hypervisor 105, ESPR 215a through ESPR 215d, hardware processor manager program 150, hardware thread 220a through hardware thread 220d, and arbitrary entitlement capacity program 190.

LPAR may be associated with one or more hardware threads and each hardware thread has one entitlement SPR. Arbitrary entitlement capacity program 190 links each LPAR to a hardware thread, where each hardware thread has one entitlement SPR. For instance, in the depicted embodiment, LPAR 210a is linked with ESPR 215a. ESPR 215a percentage is loaded with the value contained in LPAR 210a REQ %, which is 25%. LPAR 210b REQ % is linked with ESPR % 215b. ESPR % 215b is loaded with the value contained in LPAR 210b REQ %, which 10%, and so on and so forth. This allocation of LPAR to entitlement SPR would continue until all LPARs are each assigned an entitlement SPR, and the entitlement SPR is loaded with the associated LPAR's REQ %.

Hardware processor manager program 150 can be software, hardware, firmware, or any combination, but in various embodiments hardware processor manager program 150 is implemented as a hardware entity. In various embodiments, hardware processor manager program 150 provides sufficient resources for execution of a hardware thread. Each entitlement SPR is dedicated to a single LPAR, and consequently a hardware thread, containing a group of instructions, possibly one, of the LPAR. Since a hardware thread is linked to an entitlement SPR, and entitlement SPR is linked to an LPAR, the hardware thread is indirectly linked to an LPAR. In the depicted embodiment once a hardware thread is associated with an entitlement SPR, the association remains intact until the LPAR is removed by hardware processor manager program 150. In other embodiments, hardware processor manager program 150 a hardware thread is not linked with a specific entitlement SPR, which allows hardware threads to be loaded with instructions from any LPAR. However, in all embodiments, hardware processor manager program 150 keeps track of which hardware thread has which LPAR instructions and still provides the percentage of core capacity to the hardware thread temporarily associated with an LPAR.

Hardware processor manager program 150 will provide to the hardware thread sufficient resources equal to, or approximately equal to, the associated entitlement SPR % value. For instance. LPAR 210b requirement is 10%, which means LPAR 210b requires a minimum of 10% of core capacity; consequently, hardware processor manager program 150 will attempt to dispatch LPAR 210b hardware thread 10% of the time.

In other embodiments, an LPAR link can be moved to another entitlement SPR or an LPAR can be linked to several entitlement SPRs. In these embodiments, hardware processor manager program 150 manages the multiple entitlement SPRs and hardware threads linked to a single LPAR. However, in the depicted embodiment, if the profile of a running LPAR is changed, it is considered a new LPAR; consequently, the LPAR/ESPR/hardware thread link is removed and the LPAR would be a free entitlement SPR.

Figure 3:
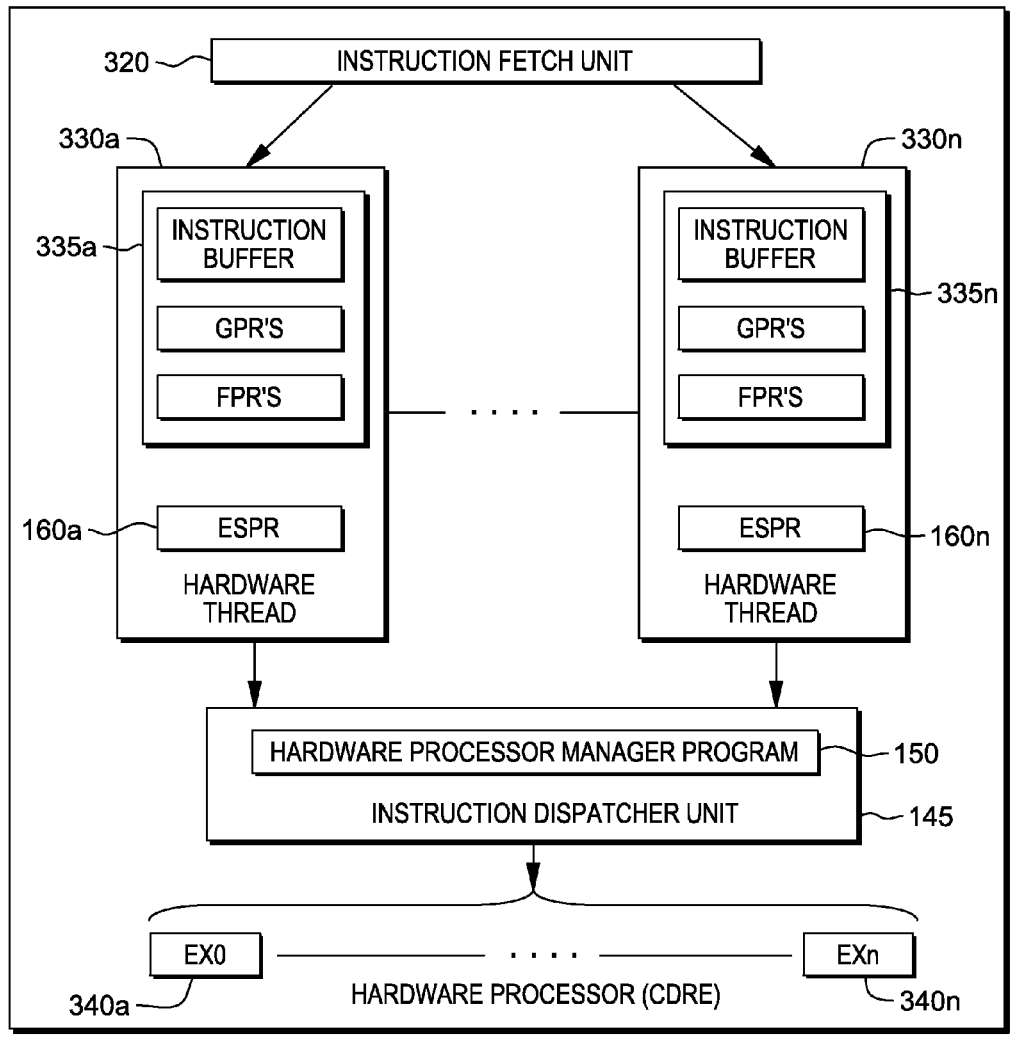
FIG. 3 depicts operations of a hardware processor controlled by an instruction dispatcher unit, in accordance with one embodiment of the present invention.

FIG. 3 depicts operations of a hardware processor controlled by instruction dispatcher unit 145, in accordance with one embodiment of the present invention. FIG. 3 contains instruction dispatcher unit 145, hardware processor manager program 150, ESPR 160a-160n, instruction fetch unit 320, hardware threads 330a-330n, thread resources 335a-335n, and EX0 340a through EXn 340n.

The depicted embodiment in FIG. 3 shows a variable number of hardware threads, in practice, as mentioned previously, there is a sufficient number of hardware threads for a one-to-one association with an LPAR. In some embodiments, functions of the hardware processor manager program and/or instruction dispatcher unit 145 are incorporated in a Thread Scheduler, not shown.

The hardware processor manager program 150, contained within instruction dispatcher unit 145, as previously mentioned, honors the entitlement SPR's value, stored in ESPR 160a-160n, and dispatches instructions from hardware threads in accordance of entitlement SPR's value. ESPR holds the entitlement value for the LPAR. Hardware processor manager program 150 accesses the value in ESPR to determine the number of dispatches for a particular hardware thread.

Hardware threads 330a-330n contain thread resources 335a-335n, respectively. Thread resources 335a-335n contain storage for the particular hardware thread, that include, but are not limited to: instruction buffers, general purpose registers, and floating point registers. Instruction buffers hold the instructions (corresponding to a given thread) fetched by instruction fetch unit 320. General Purpose Registers (GPRs) hold fixed point data and/or addresses for computations. Floating Point Registers (FPRs) hold floating point data for floating point computations. In practice, thread resources 335a-335n may contain other special purpose registers to hold a pointer to page table, status, and/or control information; however, these are not shown for simplicity. Instruction fetch unit 320 takes instructions from memory, such as from an LPAR's instructions, and transfers the instructions into the instruction buffer of the associated hardware thread 330a-330n.

EX0 340a through EXn 340n are execution units that performs the computations, for instance, fix point/floating point computation, loading/storing data, etc. EX0 340a through EXn 340n produces computation results, which are written back to GPRs/FPRs or SPRs, or to cache/memory depending upon the type of execution unit.

Typically, on each clock-cycle instruction dispatcher unit 145 will collect a group of thread instructions from one thread and dispatch the thread instructions to resources; in the next clock-cycle instruction dispatcher unit 145 collects another group of instruction from another thread and dispatch them, such as there is a generally equal sharing of the physical resources among the threads. Conversely, in embodiments of the present invention, there may be an unequal sharing of physical resources among the four threads. In each clock-cycle instruction dispatcher unit 145 collects a group of thread instructions from one thread based on the entitlement SPR % associated with the hardware thread, such as one of the hardware threads 330a-330n. One hardware thread may dominate the resources of the hardware processor, as the entitlement SPR % value, a value from ESPR 160a-160n, would be larger than all the other entitlement SPR % values.

For example, for every processor clock-cycle, instruction dispatcher unit 145 would collect a group of instructions from one of the available hardware threads, and assigns all necessary hardware resources to the group of instructions.

For next processor clock-cycle, instruction dispatch unit 145 collects a group of instructions from another hardware thread, possibly the same thread, and assigns the group all necessary hardware resources. Instruction dispatcher unit 145 attempts to dispatch groups according to the entitlement SPR. In the instance when a processor clock-cycle is one millisecond, for 1000 processor clock-cycles, and entitlement SPR is set to 50%, the associated hardware thread would receive 500 dispatches. Hardware processor management program 150 contains the logic to enable dispatching according to the entitlement SPR.

Figure 4:
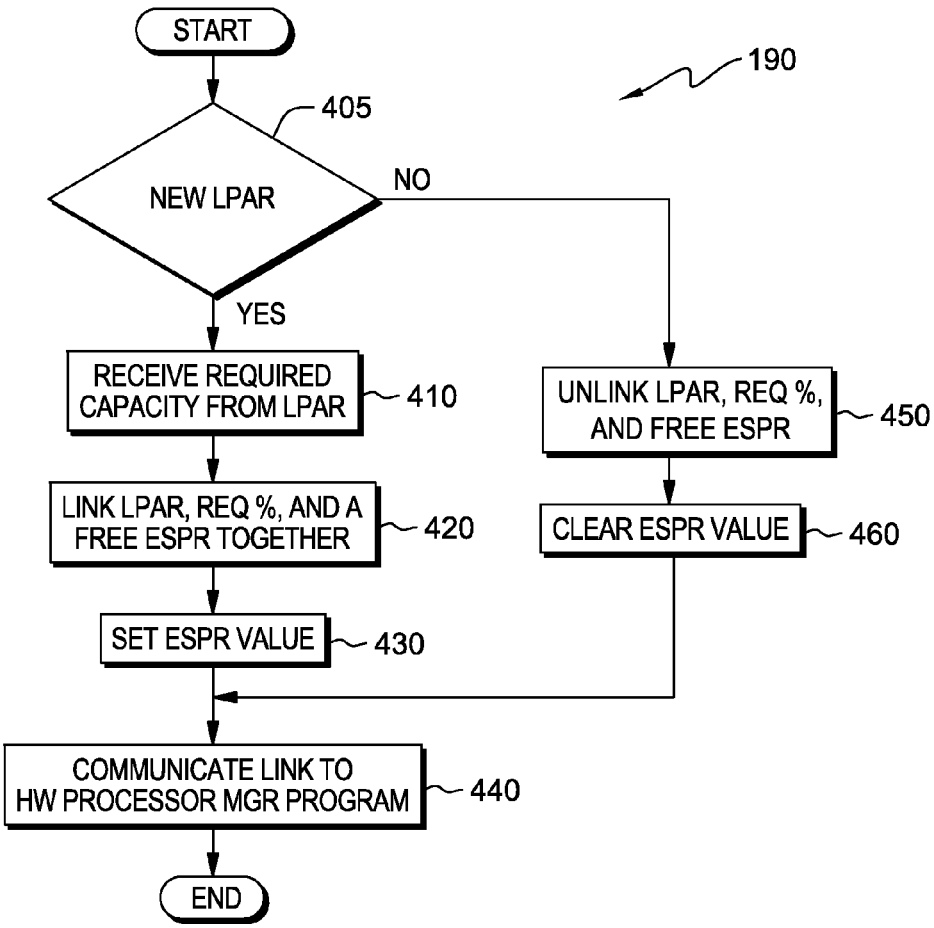
FIG. 4 is a flowchart depicting the steps of the arbitrary entitlement capacity program, in accordance with one embodiment of the present invention.

FIG. 4 is a flowchart depicting the steps of arbitrary entitlement capacity program 190, in accordance with one embodiment of the present invention. Arbitrary entitlement capacity program 190 sets an entitlement SPR to a percentage and links an LPAR to the entitlement SPR. Additionally, when an LPAR is terminated arbitrary entitlement capacity program 190 unlinks the SPR with the LPAR and frees the entitlement SPR. Arbitrary entitlement capacity program 190 is invoked by hypervisor 105 during the creation and a termination of an LPAR.

In decision step 405, arbitrary entitlement capacity program 190 determines if an LPAR is being newly created or is being terminated. Arbitrary entitlement capacity program 190 because a newly created LPAR would not contain a link; conversely, invoking arbitrary entitlement capacity program 190 when the LPAR contains a link would indicate that the LPAR is being terminated. When an LPAR is being created, arbitrary entitlement capacity program 190 takes transitions to step 410 (decision step "YES" branch). When an LPAR is being terminated, arbitrary entitlement capacity program 190 transitions to step 450 (decision step "NO" branch).

In step 410, arbitrary entitlement capacity program 190 receives a required LPAR's REQ % from the profile of the LPAR. LPAR's REQ % is passed as an argument to arbitrary entitlement capacity program 190 at invocation. The required LPAR's REQ %, entitlement processor resource percentage, is in the form of a percentage that represents the minimum amount of dispatches the LPAR requires to execute.

In step 420, arbitrary entitlement capacity program 190 links the LPAR/REQ % to a free entitlement SPR. An implementation for linking LPARs to entitlement SPRs is that of a table of LPARs and entitlement SPRs, in which entitlement SPRs are initially labeled available. As LPARs are created arbitrary entitlement capacity program 190 finds an available entitlement SPR in the table and associates the LPAR with the table index. Examples of free entitlement SPR values include, but are not limited to: 0%, <blank>, or a number greater than 100%. Another implementation is utilizing a linked-list of entitlement SPRs, as someone skilled in the arts would recognize. In some instances, there may only be one or two LPARs created, leaving a number of entitlement SPRs without an associated LPAR, therefore, in other embodiments, arbitrary entitlement capacity program 190 may use the free entitlement SPRs; thus a given LPAR would receive more resources, and more dispatches, than the LPAR's required minimum.

In step 430, arbitrary entitlement capacity program 190 sets the associated entitlement SPR, determined in step 420, to the value of the REQ % for the associated LPAR. Arbitrary entitlement capacity program 190 has direct access to all entitlement SPRs. Access to the entitlement SPR can be by reference or by a hardware overlay data record, as someone skilled in the art would recognize.

In step 440, in the case where the transition was from step 430, arbitrary entitlement capacity program 190 communicates to hardware processor manager program 150 the new link between entitlement SPR and LPAR, so that hardware processor manager program 150 can run the correct hardware thread instruction for the LPAR. In the case where the transition was from step 460, arbitrary entitlement capacity program 190 communicates to hardware processor manager program 150 to unlink an entitlement SPR and LPAR. In one embodiment, the communication can be in the form of a message. In other embodiments, hardware processor manager program 150 can access the table of LPARs and entitlement SPRs that arbitrary entitlement capacity program 190 utilizes in a previous step.

In step 450, arbitrary entitlement capacity program 190 unlinks the LPAR from and entitlement SPR and sets the entitlement SPR value to available. The unlinking entails finding the link in the table of LPARs and entitlement SPRs and setting the values to free. Setting the entitlement SPR value to available allows the entitlement SPR to be reused with another LPAR.

In step 460, arbitrary entitlement capacity program 190 clears the entitlement SPR that was associated with the LPAR that is being terminated. Access to the entitlement SPR can be by reference or by a hardware overlay data record, as someone skilled in the art would recognize.

Figure 5:
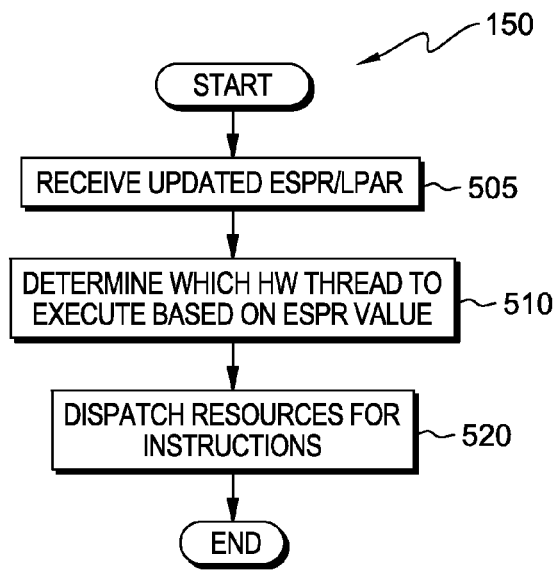
FIG. 5 is a flowchart depicting the steps of the hardware processor manager program, in accordance with one embodiment of the present invention.

FIG. 5 is a flowchart depicting the steps of hardware processor manager program 150, in accordance with one embodiment of the present invention. Hardware processor manager program 150 is invoked on each clock-cycle to provide sufficient resources and dispatches to the hardware thread.

In step 505, hardware processor manager program 150 receives updated link between entitlement SPR and LPAR from arbitrary entitlement capacity program 190. In one embodiment, the link can be in a message that is received. Hardware processor manager program 150 stores the association between entitlement SPR and LPAR in memory accessible by hardware processor manager program 150.

In step 510, hardware processor manager program 150 determines which hardware thread instructions to execute based on entitlement SPR value. Hardware processor manager program 150 keeps track of how many dispatches a hardware thread received. In one embodiment, tracking is in the form of a tracking table that simply counts dispatches per a number of cycle times, for instance, 1000 hertz. Hardware processor manager program 150 determines which hardware thread will receive processor resources. For instance, if an entitlement SPR contains a value of 25%, hardware processor manager program 150 will execute the hardware thread linked with the entitlement SPR 25% of the time, thus out of 1000 hertz the entitlement SPR would receive approximately 250 dispatches. In other embodiments, hardware processor manager program 150 performs step 510 by a Thread Scheduler or other functions of the instruction dispatcher unit 145, which both may function in conjunction with hardware processor manager program 150.

In step 520, hardware processor manager program 150 allocates all necessary resources to execute the hardware thread instructions. Instructions include, but are not limited to: (i) address generation; (ii) branch; (iii) data-cache access; (iv) execute; (v) formatting; (iv) and instruction-cache access.

Figure 6:
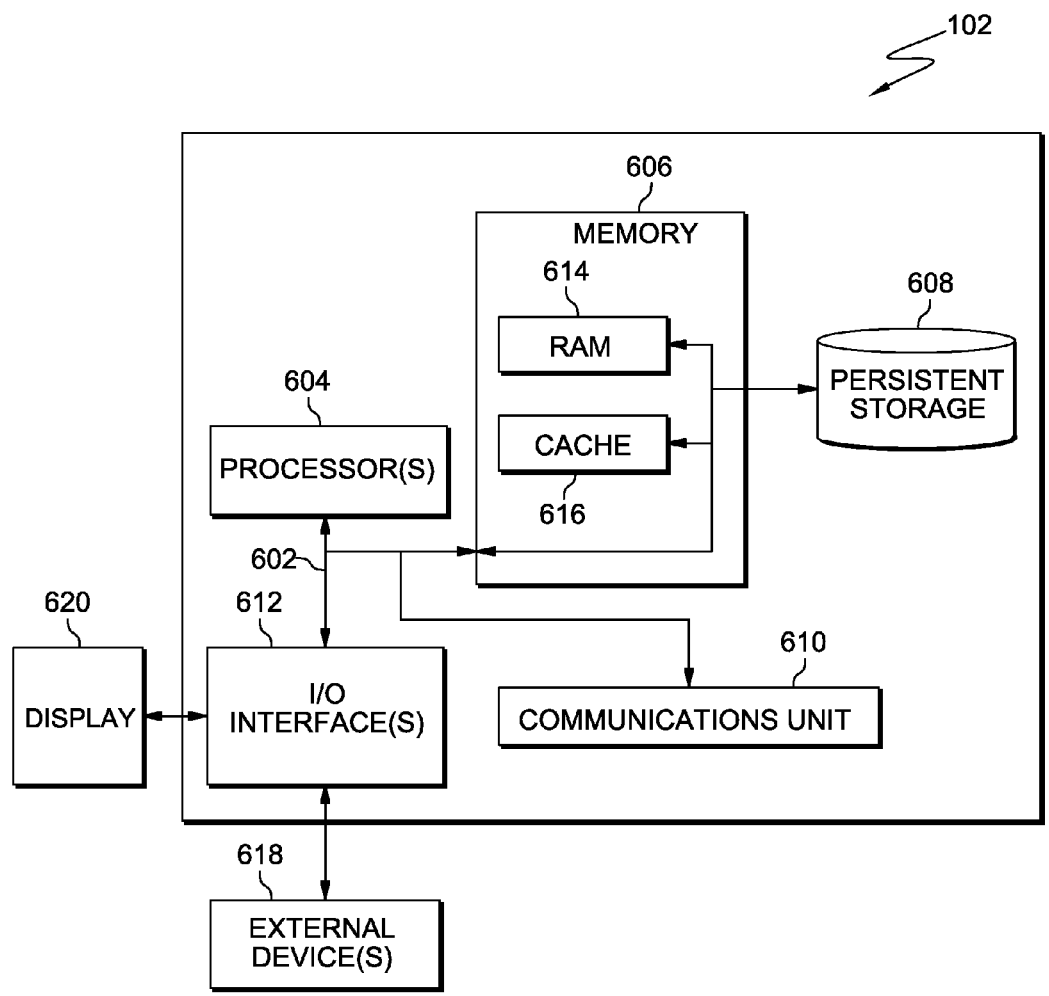
FIG. 6 depicts a block diagram of components of the computers of FIG. 1, in accordance with one embodiment of the present invention.

FIG. 6 depicts a block diagram of components of computers CEC 102, in accordance with one embodiment of the present invention. It should be appreciated that FIG. 6 provides only an illustration of one implementation and does not imply any limitations with regard to the environments in which different embodiments may be implemented. Many modifications to the depicted environment may be made.

CEC 102 include communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Hardware processor manager program 150 and arbitrary entitlement capacity program 190 are stored in persistent storage 608, of CEC 102, for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of computer infrastructure 100 and other devices (not shown). In these examples, communications unit 610 includes one or more network interface cards. Communications unit 610 may provide communications through the use of either or both physical and wireless communications links.

Hardware processor manager program 150 and arbitrary entitlement capacity program 190 may each be downloaded to persistent storage 608, of CEC 102, through communications unit 610 of CEC 102.

I/O interface(s) 612 allows for input and output of data with other devices that may be connected to CEC 102. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., hardware processor manager program 150 and arbitrary entitlement capacity program 190, can be stored on such portable computer-readable storage media and can be loaded onto persistent storage 608 of CEC 102, via I/O interface(s) 612 of CEC 102. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer program product comprising a non-transitory computer-readable storage medium having a set of instructions stored therein, which, when executed by a processor, causes the processor for scheduling the execution of a computer instruction by:
   determining an entitlement processor resource percentage for a logical partition of a plurality of logical partitions on a computer system;
   associating the logical partition to an entitlement special purpose register of a hardware thread in a set of entitlement special purpose registers, wherein the logical partition does not time-share the entitlement special purpose register with any other logical partition in the plurality of logical partitions;
   setting an entitlement special purpose register percentage for the entitlement special purpose register equal to the entitlement processor resource percentage;
   fetching an instruction from the logical partition; and
   causing a processor to dispatch the instruction to the hardware thread for processing according to the entitlement special purpose register percentage;
   wherein:
      the entitlement processor resource percentage is honored by the processor in determining how a set of physical resources are to be shared among the plurality of logical partitions.

2. The computer program product of claim 1, wherein the entitlement processor resource percentage represents a percentage of execution capacity of the processor given to the hardware thread associated with the logical partition.

3. The computer program product of claim 1, wherein the entitlement processor resource percentage is pre-defined by a profile of the logical partition.

4. The computer program product of claim 1, wherein the step of setting the entitlement special purpose register percentage equal to the entitlement processor resource percentage includes:
  linking the entitlement processor resource percentage with the entitlement special purpose register percentage to dedicate the logical partition to the register.

5. A computer system for scheduling the execution of a computer instruction, the computer system comprising:
  a processor set; and
  a non-transitory computer readable storage medium;
  wherein:
    the processor set is structured, located, connected, and/or programmed to run program instructions stored on the computer readable storage medium; and
    the program instructions which, when executed by the processor set, cause the processor set to schedule the execution of a computer instruction by:
      determining an entitlement processor resource percentage for a logical partition of a plurality of logical partitions on a computer system;
      associating the logical partition to an entitlement special purpose register of a hardware thread in a set of entitlement special purpose registers, wherein the logical partition does not time-share the entitlement special purpose register with any other logical partition in the plurality of logical partitions;
      setting an entitlement special purpose register percentage for the entitlement special purpose register equal to the entitlement processor resource percentage;
      fetching an instruction from the logical partition; and
      causing a processor to dispatch the instruction to the hardware thread for processing according to the entitlement special purpose register percentage;
      wherein:
        the entitlement processor resource percentage is honored by the processor in determining how a set of physical resources are to be shared among the plurality of logical partitions.

6. The computer system of claim 5, wherein the entitlement processor resource percentage represents a percentage of execution capacity of the processor given to the hardware thread associated with the logical partition.

7. The computer system of claim 5, wherein the entitlement processor resource percentage is pre-defined by a profile of the logical partition.

8. The computer system of claim 5, wherein the step of setting the entitlement special purpose register percentage equal to the entitlement processor resource percentage includes:
  linking the entitlement processor resource percentage with the entitlement special purpose register percentage to dedicate the logical partition to the register.

* * * * *